(No Model.)

O. J. WESTFALL.
HORSE COLLAR.

No. 555,545. Patented Mar. 3, 1896.

WITNESSES:
Charles W. Morvin
Jessie E. Murray

INVENTOR
Oscar J. Westfall

BY
Smith & Amison
ATTORNEYS.

UNITED STATES PATENT OFFICE.

OSCAR J. WESTFALL, OF FAIRMOUNT, NEW YORK.

HORSE-COLLAR.

SPECIFICATION forming part of Letters Patent No. 555,545, dated March 3, 1896.

Application filed December 28, 1895. Serial No. 573,653. (No model.)

*To all whom it may concern:*

Be it known that I, OSCAR J. WESTFALL, of Fairmount, in the county of Onondaga, in the State of New York, have invented new and useful Improvements in Horse-Collars, of which the following, taken in connection with the accompanying drawings, is a full, clear, and exact description.

My invention relates to horse-collars, and particularly to that class which are adapted to be used upon horses having sore or galled shoulders while they are healing, or to be used by all horses, and readily convertible in case a shoulder or neck becomes sore.

My object is to produce an improved collar provided with pads subdivided into transverse sections, each section being provided near its ends with perforations through which bolts, having either a hook or an eye upon one end, are inserted, and provided with a suitable rod which is inserted through said hooks and which is drawn tightly against the pad when the nuts are screwed up onto said bolts, and so that when any pair of bolts are loosened the pad so released can be taken out, thus leaving a space open to bridge over a sore and protect it from any pressure while it is healing, such collar comprising a suitable body, a suitable outer facing thereon, suitable straps and buckles at the top to adjust the size of the collar, in addition to the pads, eyebolts and wires.

My invention consists in the several novel features of construction and operation hereinafter described and which are specifically set forth in the claim hereunto annexed. It is constructed as follows, reference being had to the accompanying drawings, in which—

Figure 1:
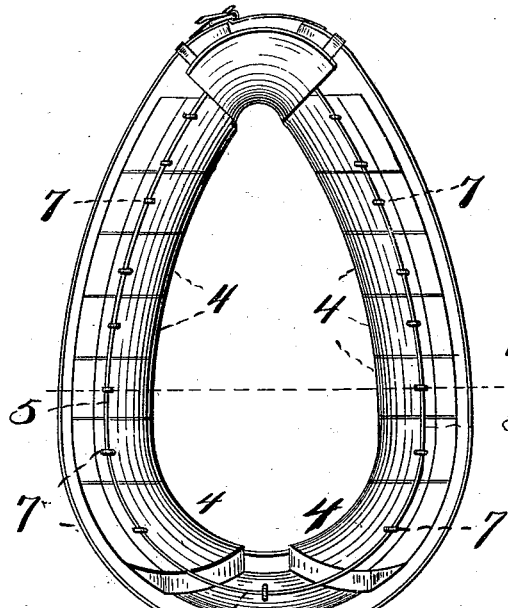
Figure 2:
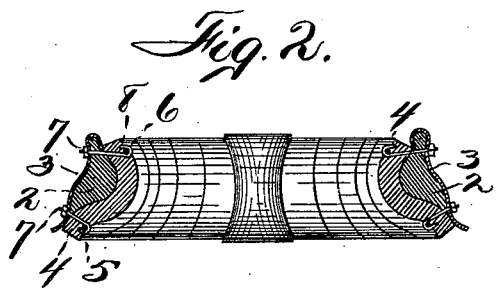
Figure 3:
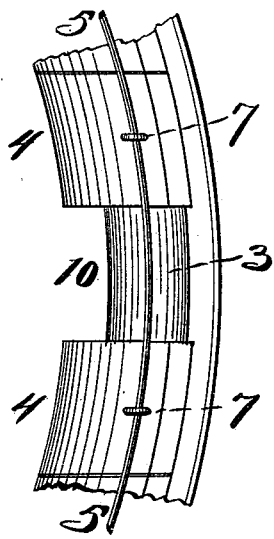
Figure 4:
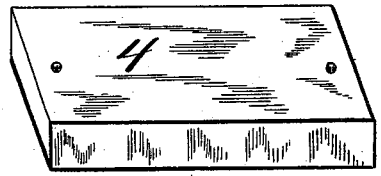
Figure 5:
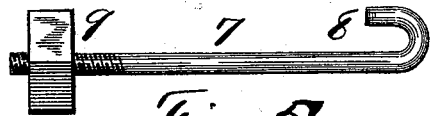

Figure 1 is a rear elevation of the collar. Fig. 2 is a transverse section thereof upon the dotted lines in Fig. 1. Fig. 3 is an enlarged detail of part of one side of the collar, showing a pad-section removed. Fig. 4 is a plan perspective of one of the pad-sections. Fig. 5 is an elevation of a suitable bolt to secure one end of a pad-section.

The collar consists of a suitable body 2, provided with a suitable outer facing 3, pad-sections 4, of felt or other suitable material, retaining-wires 5 6, and suitable bolts 7, having a hook or eye 8 upon one end and a nut 9, said bolts being inserted through the pad-sections and through the body and facing having the nuts upon the latter and having the hooks or eyes engaging with said wires.

It will be readily seen that by loosening up and removing any pair of bolts that particular pad can be removed without disturbing the adjacent pad-sections, thus leaving a gap or space 10 in either pad of the width of one or more sections, which will bridge over any gall or other sore upon the shoulder of a horse, and thus protect it from the collar and permit it to heal, although the horse may be worked every day.

Having described my invention, what I claim, and desire to secure by Letters Patent, is—

A horse-collar comprising a body, pad-sections placed thereon, bolts through the ends of said sections and through said body and retaining-wires with which said bolts engage.

In witness whereof I have hereunto set my hand on this 18th day of December, 1895.

OSCAR J. WESTFALL.

In presence of—
JESSIE E. MURRAY,
HOWARD P. DENISON.